Sept. 2, 1969    B. PIOTROWSKI, JR    3,464,321
ONE-WAY DIRECTIONAL FLUID CONTROL VALVE AND SYSTEM
Filed Nov. 29, 1966    2 Sheets-Sheet 1
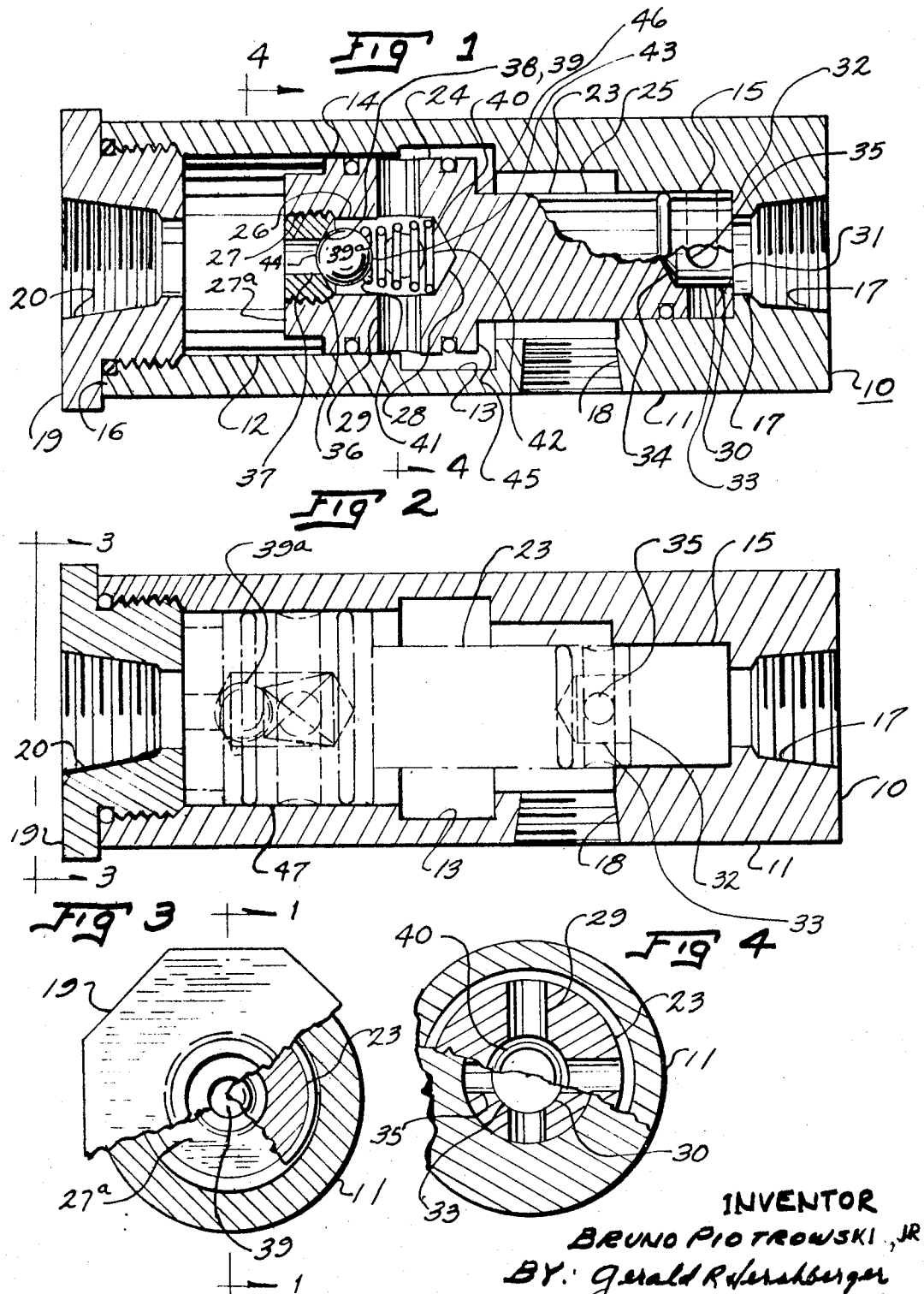
INVENTOR
BRUNO PIOTROWSKI, JR
BY: Gerald R Hershberger
ATTORNEY

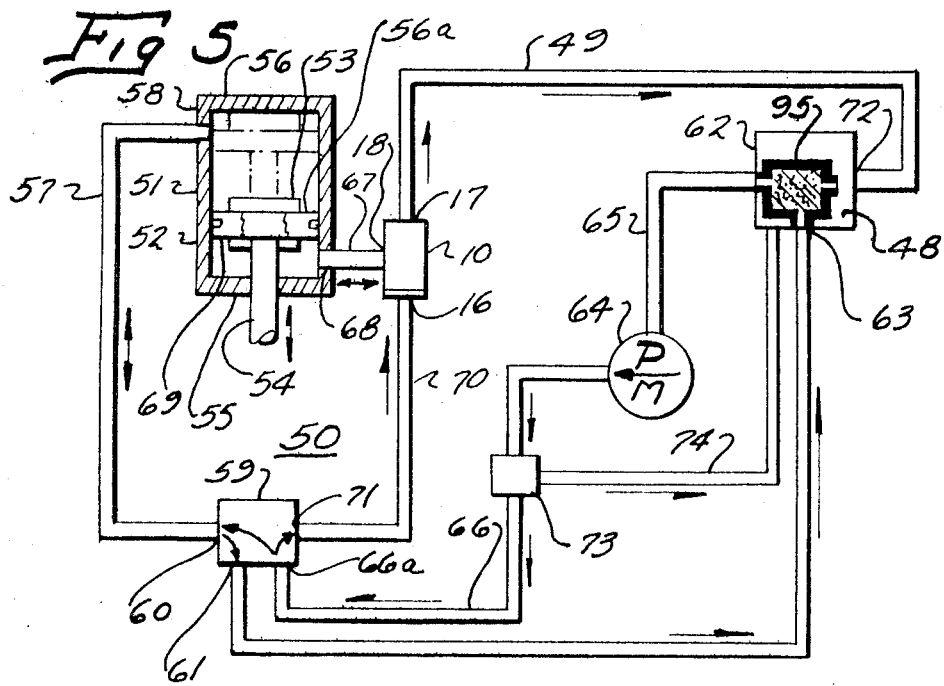
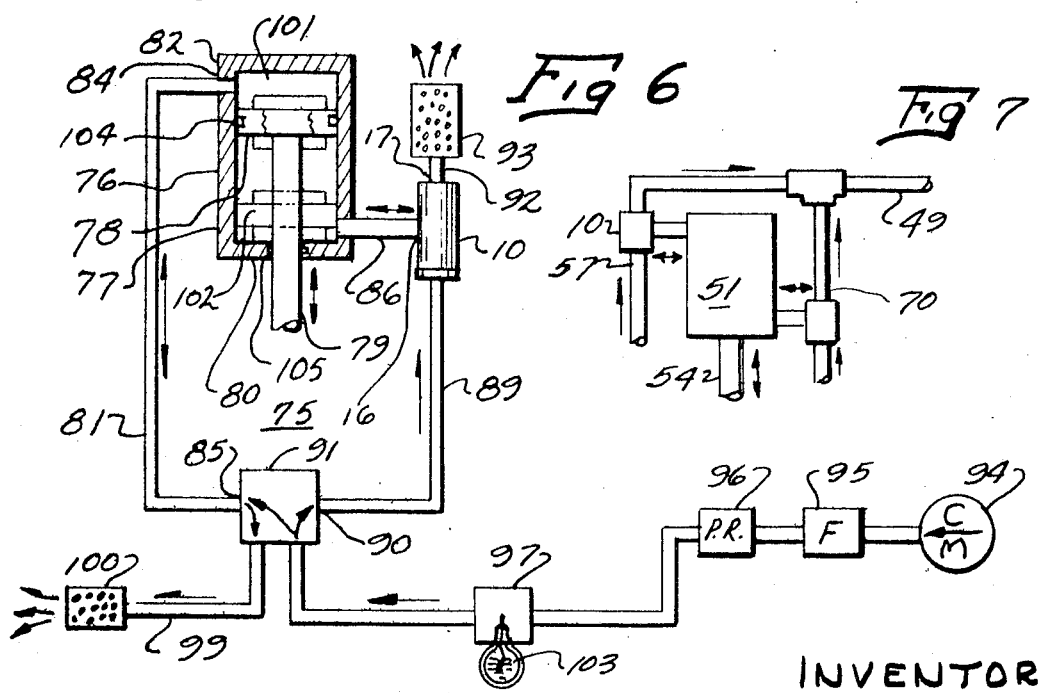

United States Patent Office 3,464,321
Patented Sept. 2, 1969

3,464,321
ONE-WAY DIRECTIONAL FLUID CONTROL
VALVE AND SYSTEM
Bruno Piotrowski, Jr., 1612 N. Blair St.,
Royal Oak, Mich. 48067
Filed Nov. 29, 1966, Ser. No. 597,633
Int. Cl. F15b 11/08, 13/04
U.S. Cl. 91—442     3 Claims

ABSTRACT OF THE DISCLOSURE

This invention relates to a valve for fluid control, having three openings, a power inlet opening, a power outlet opening, and an exhaust opening, the valve being arranged and adapted so that the passage of fluid from the power inlet to the power outlet is blocked and the exhaust opening is open when fluid is introduced into the valve under pressure from the power inlet, the passage of fluid from the power inlet opening through the power outlet opening is open and the exhaust opening is blocked when fluid is introduced into the valve under pressure through the power inlet, the valve further being arranged to block the flow of pressurized fluid from the direction of the power inlet opening which has not first passed out and in said power outlet opening from first passing from said power inlet out said exhaust opening; the valve is also incorporated into a system for lubricating and cooling a fluid power work performing cylinder by causing one-way directional flow of fluid through the valve into the cylinder from a pressurized source of fluid.

---

This invention relates to a down stream directional fluid control valve, and more particularly to a one-way directional control valve for use with hydraulic and compressed air systems, and also to a system for improving the life, efficiency and operation of power operated work cylinders used in such systems.

Presently, in the power piston and cylinder industry, a problem exists in lubricating the power cylinders, and in cooling the hydraulic fluid, where fluid is used in operation of such cylinder. Specifically, in the air cylinder industry, a problem exists in supplying lubricant from the lubricator to the cylinder, causing the packing and air seals in such cylinders to become dry and brittle resulting in excessive friction and leakages causing frequent and costly breakdowns. Specifically, as to the hydraulic systems utilizing power cylinders, in the present arrangement, the hydraulic fluid does not circulate sufficiently in the system from the pump to the piston and cylinder and reservoir causing said hydraulic fluid to heat to high temperatures adjacent and within the cylinder resulting in rapid deterioration of fluid and shortened life of cylinder packing and cylinder parts. In this connection, it is necessary to have a valve that is relatively small in size and compact for placing adjacent its respective cylinder.

It is therefore an object of this invention to provide a relatively small, compact valve, only slightly larger annularly than the conduit with which it is used, such valve operable to allow matter to flow under initial pressure from a source in one direction through an inlet port in said valve body, through a one-way check valve in said valve body out a lateral port in said body into a power cylinder, and stop return flow of fluid back through said inlet port to cause said fluid to flow out of said valve directly to the atmosphere or to the fluid source.

It is another object of this invention to provide positive down-stream air circulating means for lubricating and increasing the work life of the power cylinder of a compressed air operated work performing device.

It is a further object of this invention to provide a positive down-stream, efficient circulating means for cooling and increasing the work life of the fluid and power cylinder in a hydraulic work performing device.

It is an additional object of this invention to provide a twin-valve positive down-stream circulating means for cooling fluid and increasing the work life of the power cylinder in a hydraulic work performing system.

It is another and further object of this, my invention, to provide unidirectional flow of fluid in a hydraulic power circuit means having a pressure pump for supplying fluid under pressure from a reservoir, and a directional fluid control valve for introducing fluid from said pump into the cylinder.

Other and further objects and features of my invention will become apparent as a description of presently preferred examples of the invention are given for the purposes of disclosure, taken in conjunction with the accompanying drawings, in which like reference characters refer to like or corresponding parts throughout the several views, and wherein:

FIGURE 1 is a sectional, side elevational view taken along line 1—1 of FIGURE 3 illustrating the arrangement of the parts of the unidirectional valve of the instant invention, showing such valve arranged for supplying pressurized fluid to a working cylinder.

FIGURE 2 is a sectional view taken along line 1—1 of FIGURE 3 showing the invention in position for directing the reverse flow of matter outwardly from the work cylinder through the exhaust port in the valve.

FIGURE 3 is a sectional, fragmentary end view of the instant device showing the compact features of the invention taken in direction of arrows 3—3 of FIGURE 2.

FIGURE 4 is a sectional fragmentary end view of the device taken along lines 4—4 illustrating the spool body construction and the relation of the control passages in such spool to the valve body proper.

FIGURE 5 is a partially schematic view showing the arrangement of a typical hydraulic powered system utilizing the fluid unidirectional control means according to the invention.

FIGURE 6 is a partially schematic view showing the arrangement of a typical compressed air powered system utilizing the unidirectional fluid control means according to the invention.

FIGURE 7 is a schematic view showing an arrangement of the invention utilizing two valves in tandem to provide unidirectional fluid of hydraulic fluid in a system otherwise the same as for FIGURE 5.

Referring now to the drawings and particularly to FIGURE 1 and FIGURE 5, the valve generally is denoted by the numeral 10 and shown as having an elongated generally cylindrically outlined shell body or casing 11. The elongated valve body has a generally cylindrical opening 12 formed therethrough including an enlarged chamber 13 defined by two cylindrical walls 14 and 15 of substantially different diameters disposed intermediate the ends 16 and 17 of said cylindrical opening, one of such ends 16 forming an inlet port and the other of such ends 17 forming an exhaust port, and a lateral opening 18 formed in said valve body communicating with said enlarged chamber for passing fluid under pressure in both directions. A coupling nut 19 is threaded into said forward end 16, said nut having a threaded inlet 20 to receive the power supply end of a power conduit line. Said exhaust port 17 is provided with a threaded opening to receive conduit line for reasons that will become apparent from the description to follow. An elongated cylindrical spool 23 is mounted for endwise sliding reciprocating movement within said valve body in response to various pressure conditions as will be presently described. Said spool is provided with two external cylindrical walls 24 and 25 of substantially different diameters, which larger of said spool diameters 24 is in sliding engagement with the larger diameter 14 of said valve body enlarged chamber 13 and which lesser of the spool diameters 25 is in sliding engagement with the smaller of said enlarged chamber diameters 15. Said spool is further provided with walls defining an axial bore 26 of substantial depth having an opening 27 in the forward face 27a of said spool, which opening 27 communicates with said inlet port, said bore walls 26 terminating in a bottom transverse wall 28. The larger spool lateral wall 14 has a lateral opening 29 formed therethrough which communicate with said elongated axial bore and said enlarged chamber. The spool smaller diameter lateral wall 25 has an exhaust bore 30 axially aligned with the axis of said spool having an opening 31 in the rearward face 32 thereof, said opening 31 communicating with said exhaust port. The bore 30 is formed by annular walls 33 terminating at a transverse bottom wall 34 disposed a substantial depth from said rearward face. A lateral passage 35 is provided in said spool smaller diameter wall spaced forwardly from said rearward face and arranged to communicate with said exhaust axial bore and said enlarged chamber when said spool is in its extreme forward position. The forward axial bore 26 is closed by an annular plug 36 having an intake opening 37 therethrough in communication with said spool forward axial bore 26, said plug 36 having a tapered seat 38 on its inward face 39. A ball valve 39a is contained within said forward axial bore 26, and is of suitable size and conformation to seat on said tapered seat 38 to provide a seal, and a compression spring 40 is likewise contained within said forward axial bore having one end thereof 41 pressing against said ball valve and the other end 42 thereof bearing against said bottom transverse wall 28. The pressure of said spring being calibrated to cause slight pressure against the tapered seat and to hold the ball valve 39 in place, but not to substantially restrict or reduce the pressure of fluid introduced into said inlet port. However, fluid is completely stopped from flowing out said inlet port by the pressure of the fluid on the rearward side 43 of the ball forcing said ball valve into said seat.

The forward face 27 of said spool provides a major spool area upon which fluid entering said inlet port may work, said forward face being defined by the area enclosed within the circumference of said larger spool diameter wall 24, the area of said plug 36, and the portion 44 of said valve ball that is exposed at said intake opening 37. A transverse wall or shoulder 45 is formed at the juncture 46 of said larger spool lateral wall 24 and said spool minor circular lateral wall 25. The transverse circular wall 45 provides a spool area substantially smaller in area than that provided by forward face 27, so that when fluid is introduced into said inlet port under a predetermined pressure, passing through intake opening 37, ball valve 39, lateral passage or opening 29, and said enlarged chamber, the relative force on said forward face will be greater that the pressure on said transverse wall 45 causing said spool to move rearwardly, closing said exhaust lateral passage 35, by moving said exhaust passage into said smaller chamber diameter 15, and opening the lateral pasage or opening 29 into said chamber 13, causing unidirectional flow of fluid into said inlet port and out said valve body lateral opening 18. Conversely, stopping the flow of fluid into said inlet port under pressure cause the fluid pressure remaining at the lateral opening 18 to be greater that the inlet pressure and the pressure of fluid on the transverse wall 45 will move said spool forwardly closing said lateral passage 29 by moving said lateral opening into the closure 47 formed by the larger diameter wall 24 of said spool engaging the larger diameter 14 of said valve body.

Referring again to the drawings, FIGURE 5 and FIGURE 7 thereof disclose a unique hydraulic system which incorporates the valve 10, into said system causing improved operation thereof as will appear from the following description. The hydraulic unidirectional flow system is generally denoted by the numeral 50, and beginning in the upper right hand corner, the high pressure hydraulic cylinder 51 is comprised of the conventional tubing 52 for containing the reciprocating piston 53. The piston 53 is provided with a piston rod 54 which extends outwardly of cylinder head 55 and may be connected to working machinery (not shown). A fluid conduit line 57 is connected to said cylinder adjacent the cylinder cap 56 on the top side 56 of said piston in communication with the interior of said cylinder at passage 58, and the line 57 is further connected to four-way directional control valve 59 at passage 60. A fluid supply return line is connected to directional valve 59 at passage 61 and to the fluid supply reservoir 62 at passage 63. A hydraulic pump 64 is provided to supply fluid at high or low pressures to said system and is connected to said reservoir by lead or conduit line 65, and a conduit line 66 is provided to connect said pump to the directional valve 59 at passage 66a. A short pipe or conduit 67 is connected to said cylinder at passage 68 adjacent said cylinder head 55 on the bottom side 69 of said piston. The unidirectional valve 10 is then connected to said short pipe 67, as closely as possible to said cylinder, at the lateral opening 18 thereof. An inlet conduit pipe 70 is connected at passage 71 to said directional valve 59 and to the inlet port 16 of said unidirectional valve 10. A one-way return conduit line 49 is connected in fluid relationship to said exhaust port 17 of said valve 10 and to said reservoir at inlet 72. A pressure regulator and relief valve 73 is connected between said hydraulic pump and said directional control valve having a return lead 74 for return of excess fluid to said reservoir. In some instances the pressure regulator is part of the pump mechanism, however, in all cases the purpose of the regulator 73 is to provide fluid a predetermined pressure to said cylinder. The operation of the hydraulic system is such that manipulation of said directional control valve in one direction causes hydraulic fluid to enter the cylinder 51 at the top side 56 of said cylinder causing said piston to move downwardly, and in this position of said control valve 59, pressure from pump 64 to the bottom side of said cylinder is interrupted, and hydraulic fluid contained in the bottom side 69 of said cylinder is forced by the greater pressure from the top side 56 of said cylinder to exit by route of said conduit 67, lateral opening 18, enlarged chamber 13, lateral passage 35, exhaust axial bore 30, one-way return conduit line 49, back into said reservoir. The return of the fluid by means of said valve 10, in one-way manner results in a continuous flow of fluid from the reservoir to the pump, the piston and cylinder and back to the reservoir by way of the piston instead of the directional valve 59. In present systems the hydraulic fluid merely reciprocates back and forth in the piston from the directional control valve and the same oil is used continuously, causing rapid deterioration of the hydraulic fluid 48, and of the working parts of the cylinder, such as seals (not shown). Further, in many instances, the cylinder must necessarily be placed closely to the machinery being operated by said piston rod, and such machinery is very often operated at high temperatures, as in the case of die casting equipment, and heat treating equipment, and consequently, the cylinder 51 is heated to a high temperature by induction. The circulation of fluid provided by this device provides cooling thereof, and greater efficiency and work life to the parts of the system. Where extreme heat is encountered, the system disclosed in FIGURE 7 may be utilized. In the system disclosed therein, a valve 10 is located at said top side of said cylinder likewise as for the said bottom side, and all of the fluid entering said cylinder through said directional control valve from said pump is circulated directly to said reservoir, resulting in greater cooling effect.

Referring now to FIGURE 6, a modification of the fluid system of FIGURE 5 is shown, and air is utilized for a power medium instead of a hydraulic fluid. The air system device is denoted generally by the numeral 75, and beginning in the upper left hand corner of FIGURE 6, the air cylinder 76 is comprised of the conventional tube 77 for reciprocally containing the piston 78. The piston 78 is provided with a piston rod 79 which extends outwardly of cylinder head 80 and is connected to work performing machinery (not shown). An air conduit line 81 is connected to said cylinder 76 adjacent the cylinder cap 82 which is located on the top side 83 of said air piston 78, said air line in communication with the interior of said cylinder at passage 84, and the line 81 is also connected in closed circuit to a four-way directional control valve at passage 85. A pipe nipple 86 is connected to said cylinder air passage 87 adjacent said cylinder head 80 on the bottom side 88 of said cylinder opposite piston 78. The unidirectional valve 10 is then connected to said nipple 86 as closely as practicable to said air cylinder at the lateral opening 18 thereof. An inlet conduit air pipe 89 is connected by passage 90 to said four-way directional control valve 91 at one end thereof and at the other end thereof to inlet port 16 of said unidirectional valve 10. A nipple 92 is connected to exhaust port 17 of valve 10 and to sound muffler 93. Further included in said air power system is an air pump 94 operable to supply air under working pressures to said system connected to an air filter 95 thence to pressure regulator 96, thence to static air system lubricator 97 and thence to said four-way directional control valve 91. An exhaust pipe 99 and second muffler 100 are provided to carry exhaust air from the system, or a second valve 10 may be provided adjacent cylinder cap 82.

The operation of the air system 75 is such that manipulaiton either manually or automatically of said four-way valve 91 in one direction causes air to enter said cylinder 76 at the top closure 101 of said cylinder causing said piston 78 to move downwardly, and in this position of said control valve 98, pressure of air from pump 94 to the bottom closure 102 of said cylinder is interrupted, and residual air contained in said bottom closure 102 is forced by the greater pressure existing in said top closure 101 working on said piston 78 to exit by way of said nipple 86, lateral opening 18, enlarged chamber 13, lateral passage 35, exhaust axial bore 30, nipple 92, and muffler 93 into the atmosphere, in accordance with the function of valve 10 as previously described for the construction and operation of said valve 10. The one-way movement of air to one side of said cylinder results in a downstream movement of oil 103 from said static lubricator 97 through said four-way directional valve 91, through said line 89, through said valve 10 (with spool 23 forced rearwardly by pressure on said major spool area 27) through nipple 86 into cylinder bottom closure 102, thereby lubricating said control valve 91, directional one-way valve 10, and the cylinder walls 98, packing 104, and seals 105 associated with said piston and cylinder to prevent air leakage from the cylinder. Although high pressure systems are specifically mentioned with reference to the hydraulic system of FIGURES 5 and 6, the device works very satisfactorily with both high and low pressure systems, either hydraulic or air powered.

I claim:

1. In a downstream valve for causing a working fluid under pressure to flow in one direction only, comprising, in combination:
   an elongated valve body having a generally cylindrical opening formed therethrough, one end of which axial opening forms an inlet port for fluid under pressure, and the other end of which forms an exhaust port;
   an enlarged chamber within said valve body defining two cylindrical walls of substantially different diameters disposed intermediate the ends of said axial opening and in communication therewith, said valve body having a lateral opening formed therein connected with said enlarged chamber for passing fluid under pressure in both directions, an elongated cylindrical spool likewise comprised of two substantially different diameters mounted for sliding reciprocating movement within said valve body, which larger of said spool diameters is in sliding engagement with the larger diameter of said enlarged chamber, and which lesser of the spool diameters is in sliding engagement with the smaller of said enlarged chamber diameters, said spool including walls defining an elongated axial bore of substantial depth having an opening in the forward face of said spool communicating with said inlet port, said bore walls terminating at a bottom wall disposed a substantial depth within said larger spool diameter, said larger spool wall diameter having a lateral opening formed therein in communication with said axial bore and said enlarged chamber, said spool smaller diameter wall portion having an exhaust axial opening in communication with said exhaust port formed by annular walls terminating at a bottom wall disposed a substantial depth within said spool smaller diameter wall portion and a lateral passage adjacent the end of the said spool smaller diameter wall in communication with said exhaust axial opening, which larger diameter axial bore is closed by an annular plug having an intake opening therethrough in communication therewith and a tapered seat on its inward face, a ball valve enclosed within said elongated axial bore, said ball valve arranged to seat against said tapered seat to form a seal;
   a compression spring enclosed within said elongated within said elongated axial bore with one end thereof resting on said ball valve and the other end thereof resting on said elongated axial bore bottom wall, said spring causing said valve ball to seat on said tapered seat unless removed therefrom by fluid pressure;
   said forward face provides a major spool area subject to fluid pressure, said forward face being defined by the diameter and circumference of said larger spool diameter wall; said larger spool diameter wall is joined with said smaller spool diameter wall to form a shoulder defining a minor spool area subject to fluid pressure oppositely disposed to said major spool area;
   said exhaust opening lateral passage and said larger spool lateral opening positioned with relation to said enlarged chamber and said larger cylinder wall and said smaller cylinder wall to interrupt the communication between said chamber and said elongated axial bore when said spool is in its substantially entire forward position and to interrupt the communication between said exhaust axial bore and said chamber when said spool is in its substantially entire rearward position, said larger spool area to smaller spool relationship causing said spool to be normally biased in the rearward position when said spool is subjected to said fluid pressure.

2. In combination with a pressurized power operated system having a source of power pressurized hydraulic fluid including a hydraulic pump and a fluid pressure regulator to regulate the pressure of the fluid coming from said pump, a working cylinder and a fluid reservoir to supply the fluid for the system;
   a device to cause downstream directional flow of said hydraulic fluid to said working cylinder, comprising, a valve casing of substantially small compact outline mounted adjacent said power cylinder having an inlet port, a feed line connected directly to said pressure regulator and said inlet port, a lateral port, a feed line contained in said valve casing connected directly to said cylinder and said lateral port, and an exhaust port contained in said valve casing, and a feed line connected to said exhaust port for returning fluid to said reservoir from one end of said cylinder exclusively;

check valve means including a check valve member mounted to reciprocate internally in said casing biased to partially restrict flow of said hydraulic fluid from said hydraulic pump to said cylinder and to completely stop flow of fluid from said cylinder back to said pump; and lateral wall means in fluid relationship with said casing and said check valve means operable to completely block flow of fluid from said source which has not first passed into said cylinder from passing first into said reservoir resulting in fresh fluid being introduced into said cylinder each time said cylinder is operated, including a second valve casing mounted adjacent said cylinder having a lateral port connected directly to the other end of said cylinder, an exhaust port connected directly to said reservoir, and an inlet port connected to said pump;

check valve means including check valve member mounted to reciprocate internally in said casing biased to partially restrict flow of said fluid from said pump to said cylinder other end and to completely stop flow of said fluid from said cylinder other end back to said pump and to divert exhaust fluid from said other end of said cylinder back to said reservoir to cause fluid to move in one direction only from said pump to said cylinder other end; and means in fluid relationship with said casing and said check valve means operable to completely block flow of fluid from said source which has not first passed into said cylinder from passing into said reservoir resulting in fresh fluid being introduced into both ends of said cylinder each time said cylinder is operated.

3. The invention as set forth in claim 2 including a directional valve interposed between said pump and said cylinder other end to reverse the flow of fluid to said cylinder.

References Cited

UNITED STATES PATENTS

| | | | |
|---|---|---|---|
| 1,923,205 | 8/1933 | Hoffman | 92—154 |
| 2,888,909 | 6/1959 | Gratzmuller | 91—442 |
| 2,932,167 | 4/1960 | Erskine | 91—446 X |
| 2,958,339 | 11/1960 | Meddock | 91—446 X |
| 3,312,510 | 5/1967 | Brehm | 60—62 X |
| 3,359,995 | 12/1967 | Parisi et al. | 137—102 |

FOREIGN PATENTS 654,091    12/1962    Canada.

CARROLL B. DORITY, Jr., Primary Examiner

U.S. Cl. X.R.

137—102; 91—446